(12) United States Patent
Tammisetti

(10) Patent No.: US 9,807,643 B1
(45) Date of Patent: Oct. 31, 2017

(54) MULTIPLE OPERATOR, SHARED COMMUNICATIONS TERMINAL

(71) Applicant: Virtual Network Communications Inc., Chantilly, VA (US)

(72) Inventor: Mohan R Tammisetti, South Riding, VA (US)

( * ) Notice: Subject to any disclaimer, the term of this patent is extended or adjusted under 35 U.S.C. 154(b) by 0 days.

(21) Appl. No.: 15/418,749

(22) Filed: Jan. 29, 2017

(51) Int. Cl.
| | |
|---|---|
| *H04W 72/00* | (2009.01) |
| *H04W 28/02* | (2009.01) |
| *H04L 12/933* | (2013.01) |
| *H04J 11/00* | (2006.01) |
| *H04W 72/04* | (2009.01) |

(52) U.S. Cl.
CPC ....... *H04W 28/0273* (2013.01); *H04L 49/109* (2013.01); *H04W 28/021* (2013.01); *H04J 11/00* (2013.01); *H04W 72/0453* (2013.01)

(58) Field of Classification Search
CPC ......... G06F 12/1027; G06F 2212/1016; G06F 2212/152; G06F 2212/206; H04J 11/00; H04L 67/1095; H04L 9/32; H04L 29/06; H04L 49/109; H04W 12/04; H04W 72/0453; H04W 28/021; H04W 28/0273
USPC ........................ 455/452.1; 711/163; 429/111
See application file for complete search history.

(56) References Cited

U.S. PATENT DOCUMENTS

| | | | | |
|---|---|---|---|---|
| 7,831,250 B2 * | 11/2010 | Johnston, Jr. | .......... | H04H 20/69 370/539 |
| 8,228,818 B2 * | 7/2012 | Chase | ..................... | H04L 43/12 370/232 |
| 8,259,662 B2 * | 9/2012 | Smith | ................... | H04W 72/04 370/329 |
| 8,806,104 B2 * | 8/2014 | Shanbhogue | ......... | G06F 12/145 711/163 |
| 9,066,363 B2 * | 6/2015 | Anderson | ......... | H04W 72/1215 |
| 9,154,278 B2 * | 10/2015 | Sharma | ................. | H04W 16/14 |
| 9,218,000 B2 * | 12/2015 | McLaughlin | ...... | G05B 23/0264 |
| 9,313,013 B2 * | 4/2016 | Scribano | ............... | H04W 16/14 |
| 9,363,090 B1 | 6/2016 | Paczkowski et al. | | |
| 9,661,018 B1 * | 5/2017 | Aziz | ..................... | H04L 63/145 |
| 9,706,431 B1 * | 7/2017 | Tammisetti | ....... | H04W 28/0273 |
| 2001/0012775 A1 * | 8/2001 | Modzelesky | ...... | H04B 7/18539 455/427 |

(Continued)

FOREIGN PATENT DOCUMENTS

GB WO 2014169969 A1 * 10/2014 ............. H04L 45/70

*Primary Examiner* — Mahendra Patel
(74) *Attorney, Agent, or Firm* — Potomac Law Group; Charles B. Lobsenz; Brian Buck

(57) ABSTRACT

Provided are a communications apparatus including an LTE central node including at least a pair of radio base stations, a processor, and at least a pair of virtualized cores respectively and operatively connected with the pair of radio base stations, each radio base station and each core being configured together on a separate, common platform and forming a base station and core set, and each base station and core set being configured to selectively coordinate communications traffic; and, in a radio access network (RAN), a communications method including receiving a first signal at a central node comprising at least a pair of radio base station and virtualized core sets, in which each set is formed as a system on a chip (SoC), and transmitting a second signal, based on the first signal, each base station and core set being configured to selectively coordinate communications traffic.

14 Claims, 10 Drawing Sheets

(56) References Cited

U.S. PATENT DOCUMENTS

| | | | |
|---|---|---|---|
| 2006/0246890 A1* | 11/2006 | Yasuda | H04W 48/04 455/425 |
| 2011/0047230 A1* | 2/2011 | McGee | H04L 41/0609 709/206 |
| 2012/0314598 A1* | 12/2012 | Sadek | H04W 16/14 370/252 |
| 2014/0226467 A1* | 8/2014 | Park | H04L 41/0806 370/229 |
| 2016/0014665 A1* | 1/2016 | Centonza | H04W 28/08 455/436 |

* cited by examiner

MULTIPLE OPERATOR, SHARED COMMUNICATIONS TERMINAL

FIELD OF THE DISCLOSURE

Disclosed embodiments relate to a system and method providing a shared communications terminal enabling multiple operator access based on effective use of available radio spectrum and communications traffic requirements.

BACKGROUND

Arrangements for wireless communications services today necessarily subject a user to the quality of services that a particular mobile network operator (MNO) is able to provide. Since such service quality is temporal in nature and depends on the integrity of the operator's infrastructure, the user may suffer an inability to upgrade service quality without enduring costs associated with MNO replacement.

Circa 2009, the Internet was in a stage of its evolution in which the backbone (routers and servers) was connected to fringe nodes formed primarily by personal computers. At that time, Kevin Ashton (among others) looked ahead to the next stage in the Internet's evolution, which he described as the Internet of Things ("IoT"). In his article, "That 'Internet of Things' Thing," RFID Journal, Jul. 22, 2009, he describes the circa-2009-Internet as almost wholly dependent upon human interaction, i.e., he asserts that nearly all of the data then available on the internet was generated by data-capture/data-creation chains of events each of which included human interaction, e.g., typing, pressing a record button, taking a digital picture, or scanning a bar code. In the evolution of the Internet, such dependence upon human interaction as a link in each chain of data-capture and/or data-generation is a bottleneck. To deal with the bottleneck, Ashton suggested adapting internet-connected computers by providing them with data-capture and/or data-generation capability, thereby eliminating human interaction from a substantial portion of the data-capture/data-creation chains of events.

In the context of the IoT, a thing can be a natural or man-made object to which is assigned a unique ID/address and which is configured with the ability to capture and/or create data and transfer that data over a network. Relative to the IoT, a thing can be, e.g., a person with a heart monitor implant, a farm animal with a biochip transponder, an automobile that has built-in sensors to alert the driver when tire pressure is low, field operation devices that assist fire-fighters in search and rescue, personal biometric monitors woven into clothing that interact with thermostat systems and lighting systems to control HVAC and illumination conditions in a room continuously and imperceptibly, a refrigerator that is "aware" of its suitably tagged contents that can both plan a variety of menus from the food actually present therein and warn users of stale or spoiled food, etc.

In the post-2009 evolution of the Internet towards the IoT, a segment that has experienced major growth is that of small, inexpensive, networked processing devices, distributed at all scales throughout everyday life. Of those, many are configured for everyday/commonplace purposes. For the IoT, the fringe nodes will be comprised substantially of such small devices.

Within the small-device segment, the sub-segment that has the greatest growth potential is embedded, low-power, wireless devices. Networks of such devices are described as comprising the Wireless Embedded Internet ("WET"), which is a subset of IoT. More particularly, the WET includes resource-limited embedded devices, which typically are battery powered, and which are typically connected to the Internet by low-power, low-bandwidth wireless networks ("LoWPANs").

In view of the above, it would be desirable to provide a radio communications system enabled to provide communications by adapting to changing communications environments and demands such that the system is contained, i.e., not reliant on infrastructure external to the system. In these and other regards, commonly owned patent application assigned to the assignee of the present application, accorded application Ser. No. 15/418,745, filed Jan. 29, 2017 and now U.S. Pat. No. 9,706,431, entitled, "Contained Radio Network System and Method for Dynamically Responding to Communications Traffic," is hereby incorporated by reference in its entirety.

SUMMARY

It is to be understood that both the following summary and the detailed description are exemplary and explanatory and are intended to provide further explanation of the present embodiments as claimed. Neither the summary nor the description that follows is intended to define or limit the scope of the present embodiments to the particular features mentioned in the summary or in the description. Rather, the scope of the present embodiments is defined by the appended claims.

An aspect of the embodiments includes a communications apparatus including an LTE central node including at least a pair of radio base stations, a processor, and at least a pair of virtualized cores respectively and operatively connected with the pair of radio base stations, each radio base station and each core being configured together on a separate, common platform and forming a base station and core set, and each base station and core set being configured to selectively coordinate communications traffic.

Another aspect of the embodiments includes, in a radio access network (RAN), a communications method including receiving a first signal at a central node comprising at least a pair of radio base station and virtualized core sets, in which each set is formed as a system on a chip (SoC), and transmitting a second signal, based on the first signal, each base station and core set being configured to selectively coordinate communications traffic.

In certain embodiments, the disclosed embodiments may include one or more of the features described herein.

BRIEF DESCRIPTION OF THE DRAWINGS

The accompanying drawings, which are incorporated herein and form a part of the specification, illustrate exemplary embodiments and, together with the description, further serve to enable a person skilled in the pertinent art to make and use these embodiments and others that will be apparent to those skilled in the art. Embodiments herein will be more particularly described in conjunction with the following drawings wherein.

DETAILED DESCRIPTION

Figure 1:
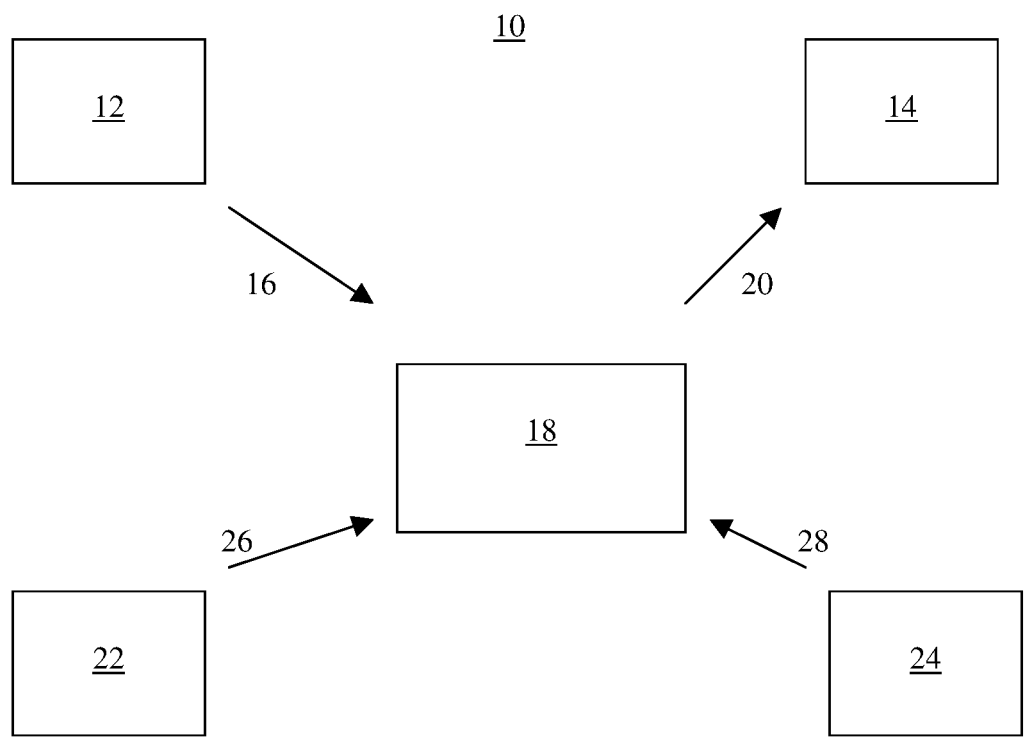
FIG. 1 is a block diagram of a Radio Access Network (RAN) according to an embodiment of the present disclosure.

The present disclosure will now be described in terms of various exemplary embodiments. This specification discloses one or more embodiments that incorporate features of the present embodiments. The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. The skilled artisan will appreciate that a particular feature, structure, or characteristic described in connection with one embodiment is not necessarily limited to that embodiment but typically has relevance and applicability to one or more other embodiments.

In the several figures, like reference numerals may be used for like elements having like functions even in different drawings. The embodiments described, and their detailed construction and elements, are merely provided to assist in a comprehensive understanding of the present embodiments. Thus, it is apparent that the present embodiments can be carried out in a variety of ways, and does not require any of the specific features described herein. Also, well-known functions or constructions are not described in detail since they would obscure the present embodiments with unnecessary detail.

The description is not to be taken in a limiting sense, but is made merely for the purpose of illustrating the general principles of the present embodiments, since the scope of the present embodiments is best defined by the appended claims.

It should also be noted that in some alternative implementations, the blocks in a flowchart, the communications in a sequence-diagram, the states in a state-diagram, etc., may occur out of the orders illustrated in the figures. That is, the illustrated orders of the blocks/communications/states are not intended to be limiting. Rather, the illustrated blocks/communications/states may be reordered into any suitable order, and some of the blocks/communications/states could occur simultaneously.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an" and "the" are intended to include the plural forms as well, unless the context clearly indicates otherwise.

The word "exemplary" is used herein to mean "serving as an example, instance, or illustration." Any embodiment described herein as "exemplary" is not necessarily to be construed as preferred or advantageous over other embodiments. Additionally, all embodiments described herein should be considered exemplary unless otherwise stated.

The word "network" is used herein to mean one or more conventional or proprietary networks using an appropriate network data transmission protocol. Examples of such networks include, PSTN, LAN, WAN, WiFi, WiMax, Internet, World Wide Web, Ethernet, other wireless networks, and the like.

The phrase "wireless device" is used herein to mean one or more conventional or proprietary devices using radio frequency transmission techniques. Examples of such wireless devices include cellular telephones, desktop computers, laptop computers, handheld computers, electronic games, portable digital assistants, MP3 players, DVD players, or the like.

In developing the present embodiments, among other things, the inventors thereof:

Realized that standard infrastructure impedes connectivity on demand;

Realized that such standard infrastructure impedes connectivity by not being coordinated with traffic ongoing in a network;

Realized that such standard infrastructure does not anticipate upcoming traffic patterns so as to be able to optimize connectivity from a historical perspective; and Realized that there exists a need to augment connectivity through rapid network deployment when the standard infrastructure is incapable of accommodating traffic due to failure caused by climate and other environmental conditions.

FIG. 1 is a block diagram of a LTE radio access network (RAN) 10 capable of supporting 2.5G, 3G, 4G, 5G, Point-to-multipoint and Point-to-point operations. Additionally, RAN 10 is contemplated to support WiFi enabled communications.

In FIG. 1, RAN 10 includes instances of end nodes such as user equipment (UEs) 12, 14, 22 and 24 configured to communicate with a central node eNodeB 18 through respectively communicated and received radio frequency (RF) signals 16, 20, 26 and 28. When transmitted, such signals may carry wireless communications traffic including, for example, voice and/or video data. It is to be understood that an amplifier (not shown) may be used to amplify signal communication, and that such signal communication may be split by duplexing circuitry, thus optimizing efficiency of communications traffic.

In terms of physical components, eNodeB 18 is, optionally, battery powered, or may be powered by an alternative power source. For example, each eNodeB 18 may be powered by solar power. Each UE may be configured as a commercially available cellphone or other smart device capable of sending and receiving wireless communications traffic.

Figure 2:
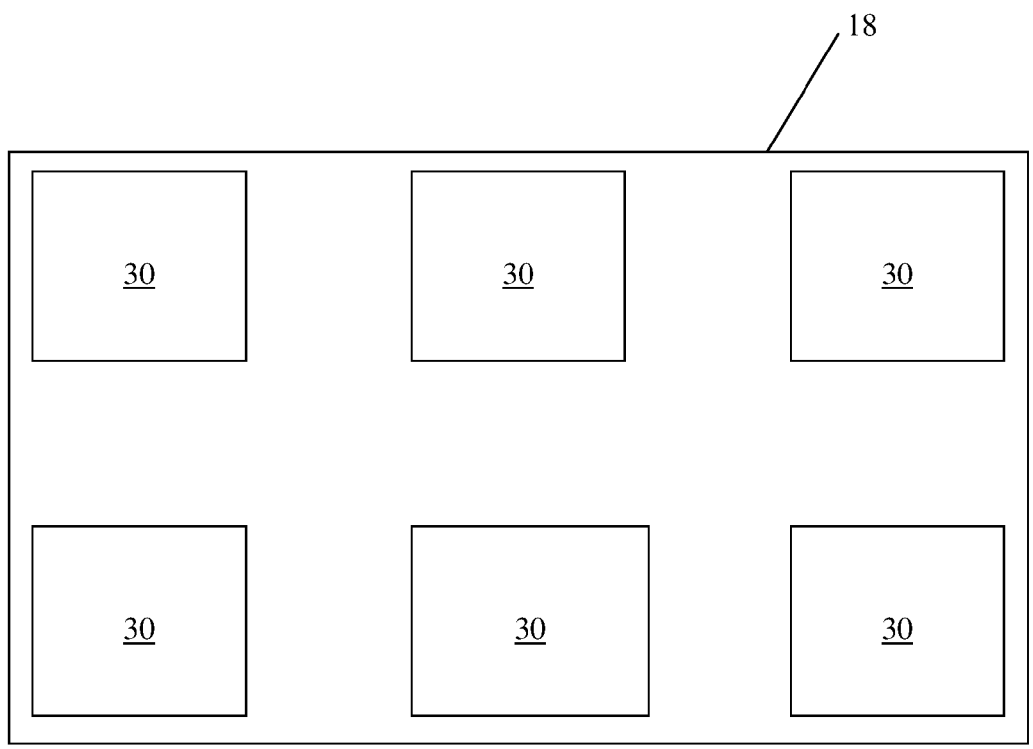
FIG. 2 is a block diagram of a central node according to the RAN of FIG. 1.
Figure 3:
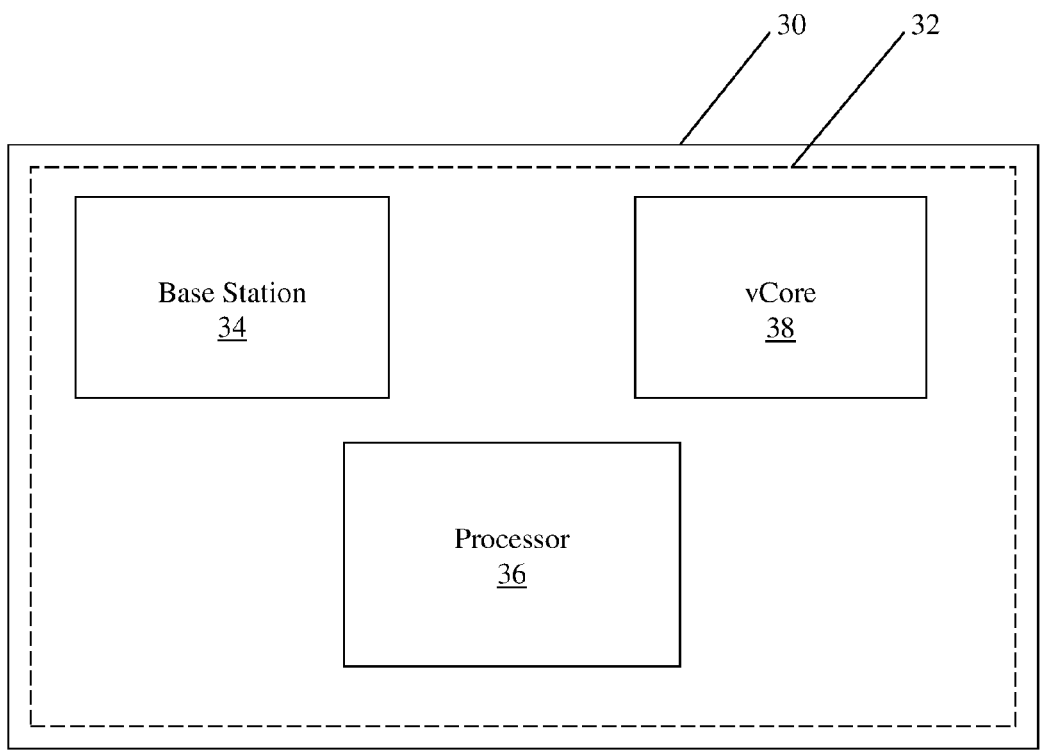
FIG. 3 is a block diagram of a component of the central node according to FIG. 2, and providing a System on Chip (SoC)

As shown throughout FIGS. 2-3, eNodeB 18 includes several component eNodeBs 30. Each component eNodeB 30 consists of a small form factor System on a Chip (SoC) 32 including a radio base station 34, a processor 36 and a virtualized core 38 so as to all reside on the common chip platform, wherein SoC 32 provides each of the radio base station 32 and virtualized core 36 as a set thereof. For instance, SoC 30 may be substantially sized accordingly to the following dimensions, including 2.5 inches in width and 1.5 inches in length, although other dimensions are also contemplated.

It is contemplated that the processor 36 comprises a commercially available 64-bit multicore processor. Herein, it will be understood that the terms, "virtualize," and "virtualized" define instances of software emulating comparable hardware capable of accomplishing functionality associated with components modified by the aforementioned terms.

As such, virtualized core 38 is a software instance that emulates a Long Term Evolution Third Generation Partnership Project (LTE 3GPP) core, i.e., an Evolved Packet Core (EPC).

Because each of the radio base station 34, processor 36 and virtualized core 38 are formed as SoC 32, the latter is portable and easily combinable with eNodeB 18 such that SoC 32 may be simply inserted into and engaged with an eNodeB 30. Accordingly, each of eNodeB 30 and SoC 32, and collectively eNodeB 18, are portable such that together with one or more UEs, RAN 10 is formed. As will be understood, therefore, RAN 10 may be deployed in a number of scenarios notwithstanding climate and environmental conditions. As will also be understood, RAN 10 may be deployed on demand, i.e., without temporal constraint, in order to achieve the communications needs of users. To facilitate such deployment, RAN 10 may be packaged in a small carrying apparatus like that of a backpack.

eNodeB 18 is further configured to be cooperable with a commercially available IEEE 802.11 compliant device (not shown) to achieve appropriate routing of received signals.

Figure 4:
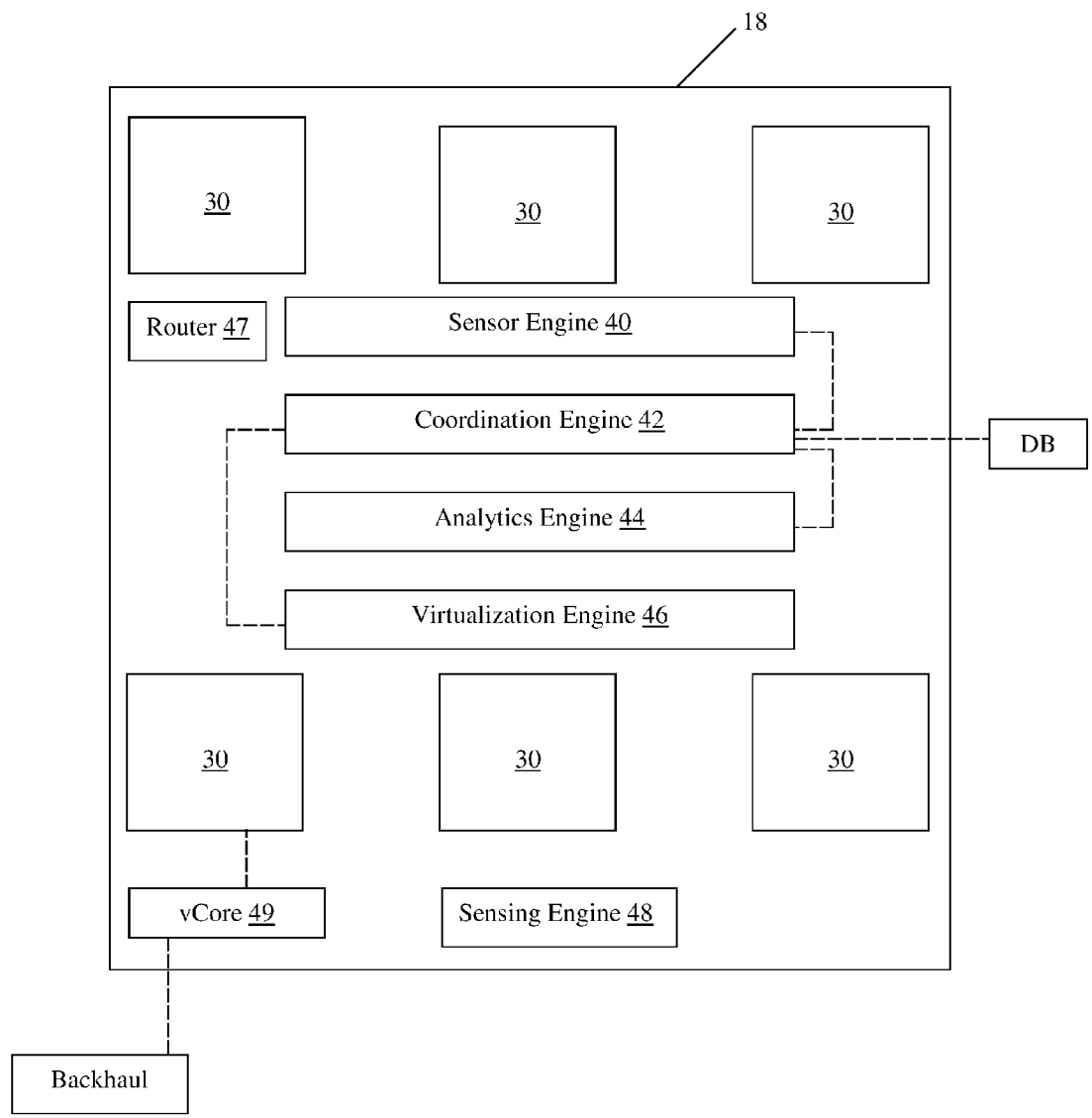
FIG. 4 is a block diagram of the central node according to FIG. 2.

FIG. 4 illustrates the central node of FIG. 2 in more detail.

Therein, a sensing engine 40, a coordination engine 42, an analytics engine 44 and a virtualization engine 46 are operatively interconnected to each other as shown, and to each eNodeB 30 through router 47. Each of the engines comprises hardware, including one or more processors, and/or software to achieve their functions as described below. Such interconnections collectively achieve selection and activation of one or more eNodeBs 30 enabled to address communications traffic for respectively assigned RF bands. Each eNodeB 30 is assigned a predetermined RF band so as to provide, for example, six (6) separate RF bands within an optional range of 400 MHz to 80 GHz. The aforementioned bands may alternatively be selected within another range of the radio spectrum.

Collectively, the nodes are cascaded to provide massive parallel processing (MPP) of communications traffic to reduce processing delay. Further, such configuration optimizes Quality of Service (QoS) within layered data communications.

Each eNodeB 30 is further contemplated to include layered security embodied as a separate chip set so as to enhance embedded security provided by virtualization of each core thereof. Such enhanced security is provided by encoding and decoding over the aforementioned embedded security.

In order to select which eNodeB 30 actively addresses communications traffic, sensing engine 40, including one or more RF sensors, is configured to sense the RF environment. That is, sensing engine 40 conducts a spectrum analysis using, for example, a spectrum analyzer, to determine which RF bands are in use and which are not so as to enable a determination regarding availability among such RF bands, wherein availability thereof includes bands which are in use.

Coordination engine 42 receives sensing input from sensing engine 40, as well input from analytics engine 44 which gathers real-time communications traffic data at predetermined intervals. Analytics engine 44 further predicts trends in such data using a predetermined algorithm, and provides the trend data to coordination engine 42.

With the above input from analytics engine 44 and sensing engine 40, coordination engine 42 selects which eNodeB 30 will address communications traffic in accordance with each of RF band availability, real-time communications traffic demand and/or a predicted communications traffic demand. In this way, communications traffic is retained locally within the RF environment sensed by sensing engine 40. Doing so enables uninterrupted communications since RAN 10 is not reliant upon external infrastructure and limitations on its functionality.

Further, it will be understood that cooperation among sensing engine 40, analytics engine 44 and coordination engine 42 optimizes load balancing by achieving an efficient routing of communications traffic based on one or more of RF band availability, assessment of real-time communications traffic and predicted communications traffic demand.

Still referring to FIG. 4, eNodeB 18 further includes a sensing engine 48 and a virtualized core 49 in communication with router 47. Sensing engine 48 is operable to sense a backhaul connection, as shown in FIG. 4, such that virtualized core 49 may be made operable, in accordance with the sensing, by virtualization engine 46 to offload communications traffic in accordance with characteristics of application-specific packets and/or unavailability of bandwidth. In particular, best effort and internet traffic offloading may occur based on the aforementioned characteristics and RF scenario.

Figure 5:
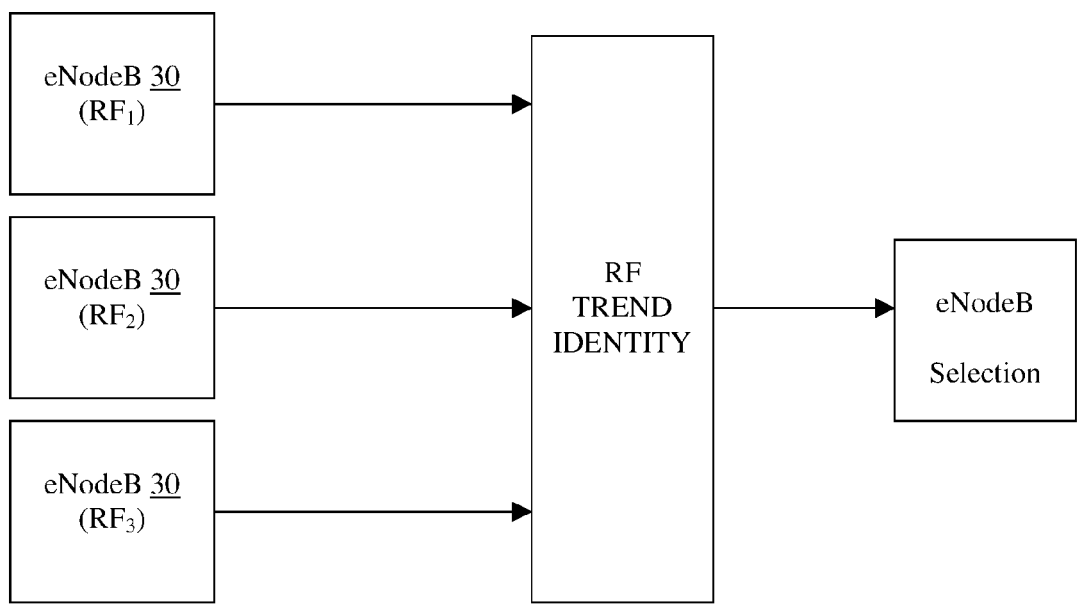
FIG. 5 is a block diagram illustrating prediction of communications traffic demand.

Prediction of traffic demand and subsequent selection by coordination engine 42 is illustrated in FIG. 5. Therein, an exemplary number three (3) of eNodeBs 30 are shown, although it is understood that less or more may be shown without affecting the manner of prediction and selection as now described. In particular, analytics engine 44 analyzes, within predetermined intervals of time and space, proximity of portions of an RF signal received from a particular eNodeB 30 with respect to preceding portions thereof. In this way, analytics engine 44 conducts an assessment for repeating identity of such proximate portions within, for example, $RF_1$, $RF_2$ and $RF_3$. Based on the presence or absence of such repetition, analytics engine 44 classifies the likelihood of a continued pattern of that repetition. Based on the classification, analytics engine 44 determines a RF Trend Identity indicating demand for a particular RF band, which is used by coordination engine 42 to achieve selection of which eNodeB 18 will address communications traffic. Accordingly, coordination engine 42 continually uses the RF Trend Identity in considering which eNodeB 30 is to be activated by virtualization engine 46, as discussed below, so as to reduce delay between such activation and data processing for communications traffic.

Virtualization engine 46 receives input from coordination engine 42 in the form of which eNodeB 30 coordination engine 42 has selected based on its received input, as described above and as is shown in FIG. 4.

Figure 6:
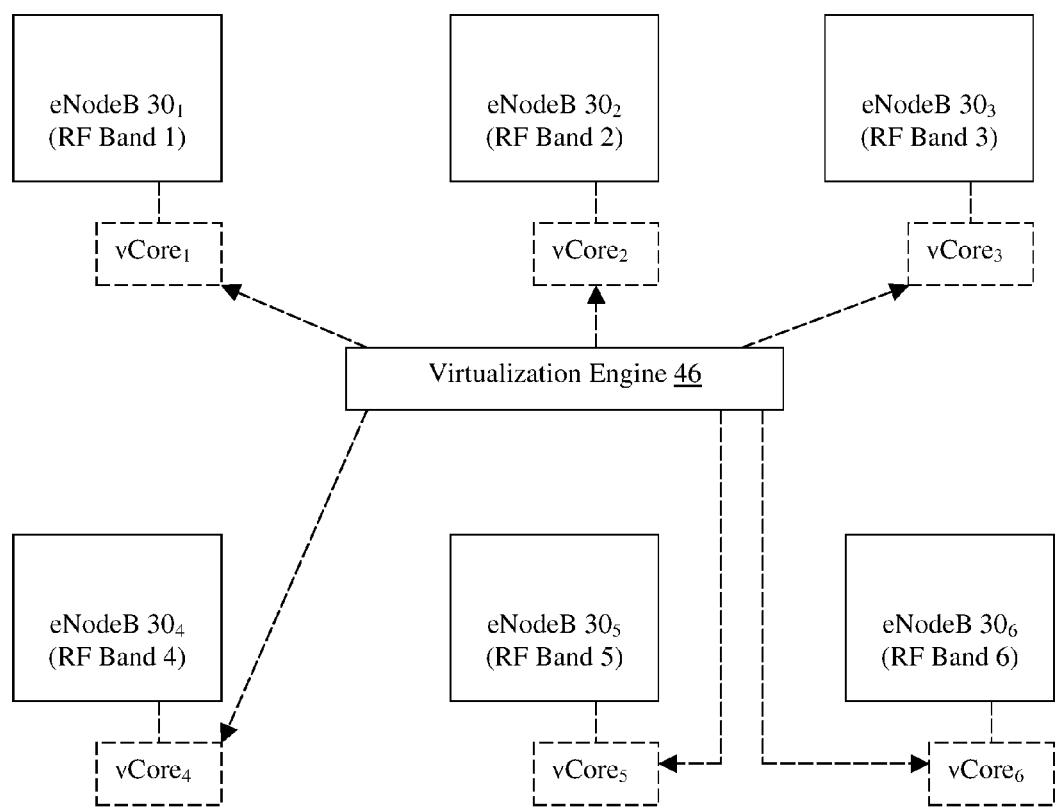
FIG. 6 is a block diagram illustrating the switching operation between virtual cores, as performed by the virtualization engine according to FIG. 4.
Figure 7:
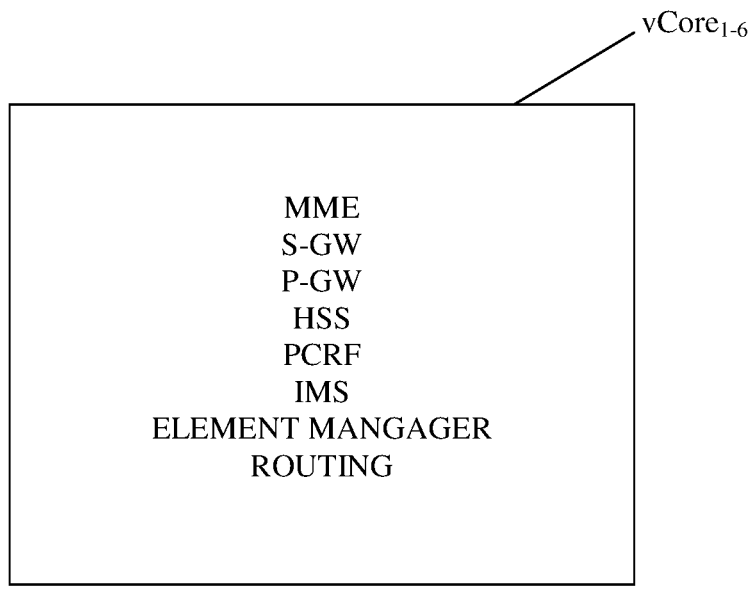
FIG. 7 is a block diagram of the LTE core configuration according to the central node of FIG. 2.

Through operative connection with each eNodeB 30, virtualization engine 46 is configured to act as a switch operable to change active/inactive states of each eNodeB 30 such that operability of a particular virtualized core or core component thereof, as shown in FIGS. 6 and 7, is changed in accordance with the switching operation. In this way, RAN 10 self-adjusts to accommodate carrying of communications traffic in accordance with a determined RF band.

In particular, based on one or more of RF band availability, assessment of real-time communications traffic, and predicted communications traffic demand as discussed with reference to FIG. 5, virtualization engine 46 actively switches operability of any one of $vCores_{1-6}$ to accommodate demand-assigned selection, from among $eNodeB\ 30_1$ through $eNodeB\ 30_6$, by coordination engine 42. In this way, selection of any one or more of $eNodeB\ 30_1$ through $eNodeB\ 30_6$ and respectively corresponding $vCores_{1-6}$ occurs in order to achieve contained radio communications within RAN 10. As such, RAN 10 provides radio communications despite the constraints imposed by conventional infrastructure and associated functionality so that such communications can be carried out, for example, in locations where radio spectrum is unavailable due to time, location and capacity constraints associated with the aforementioned conventional infrastructure. Moreover, it will be appreciated that, as a result of demand-assigned selective activation of a particular vCore, the efficiency of communications is optimized so as to reduce power consumption and other costs normally associated with conducting communications in accordance with conventional infrastructure and functionality.

FIG. 7 illustrates the overall configuration comprising the virtualized core of each component eNodeB 30. As discussed above, each virtualized core is a discrete software instance which emulates a LTE 3GPP EPC.

Accordingly, and as shown, each eNodeB 30 core includes the following: a Mobility Management Entity (MME), Serving Gateway (S-GW), Packet Data Network Gateway (P-GW), and Home Subscriber Server (HSS). Policy and Charging Rules Function (PCRF), IP Multimedia Core Network Subsystem (IMS), Element Management System (EMS), and Routing may optionally be included as part of each virtualized core comprising each eNodeB 18.

Based on selection by the coordination engine 42 and activation by virtualization engine 44, one or more of the above core components may be selectively activated.

Furthermore, such activation may be further coordinated by coordination engine 42 based on an allocation of an available RF band. Here, the allocation is defined by an operator operating on the available RF band and a user's entry of the operator's network identification (ID), such that the available RF band corresponds to the operator for which the ID pertains. To facilitate the allocation, coordination engine is in communication with database DB, as shown in FIG. 4 and which stores network ID information corresponding to one or more mobile communications operators.

An example allocation is made in the following instance. Assuming that a first RF band is available, such band may be deemed to be among those bands which may be selected by coordination engine if the user has permission to enter, and does enter on a UE, the network ID corresponding to an operator A, as provided by FIG. 8 discussed below.

Based on the above allocation, and ultimate selection made by coordination engine 42, communications traffic may be selectively routed to an eNodeB 30 to achieve a variety of traffic control conditions. For example, such conditions include transmission of only selected types of data, while other types thereof are offloaded. Accordingly, it is to be understood that coordination engine 42 may select a particular eNodeB 30 that is to conduct communications traffic based on one or more of availability of an RF band, an allocation, an assessment of real-time communications traffic and/or a prediction of communications traffic based on the aforementioned assessment.

It is further contemplated that eNodeB 18 may dedicate a given component eNodeB 30 for operating a private network so as to create new, unlicensed spectrum.

Figure 8:
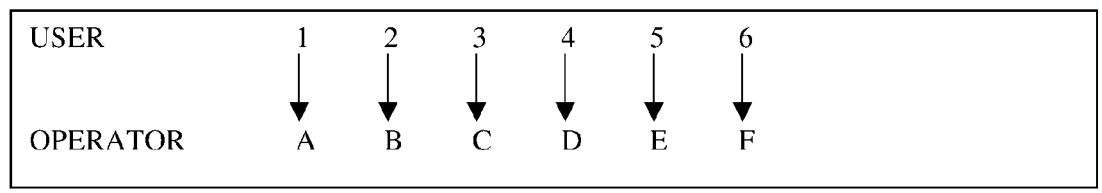
FIG. 8 is a chart showing correspondence between allocation by a user of an available RF band with respect to a mobile network operator (MNO)

FIG. 8 is a block diagram showing correspondence between allocation by a user to a Mobile Network Operator (MNO). Entry by a user of a network ID corresponding to a particular MNO enables the user to select the corresponding MNO when that MNO is operating on an available RF band sensed by sensing engine 40. For instance, such correspondence is embodied as an allocation by User 1 to MNO "A," etc.

Figure 9:
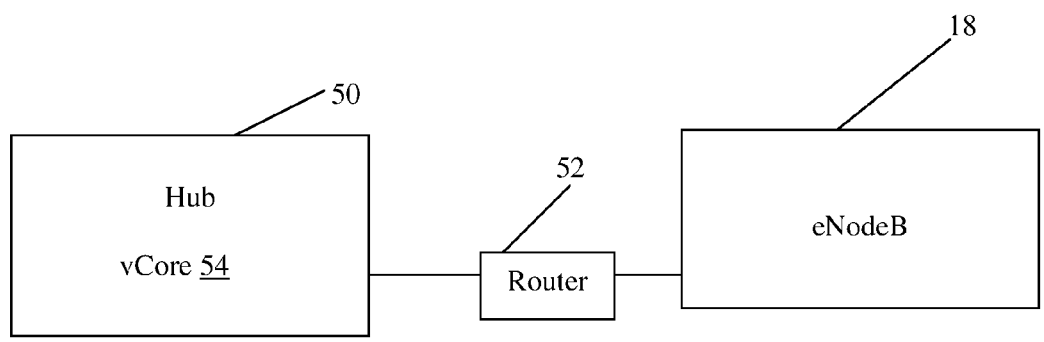
FIG. 9 is a block diagram of the central node of FIG. 2 in communication with a hub.

FIG. 9 is a block diagram illustrating connection between eNodeB 18 and a hub 50. Specifically, connection is made by a router 52 enabling communications traffic to flow to hub 50. There, such traffic may be processed by virtualized core 54. That is, core functionality may be split between eNodeB 18 to permit offloading, as necessary.

Figure 10:
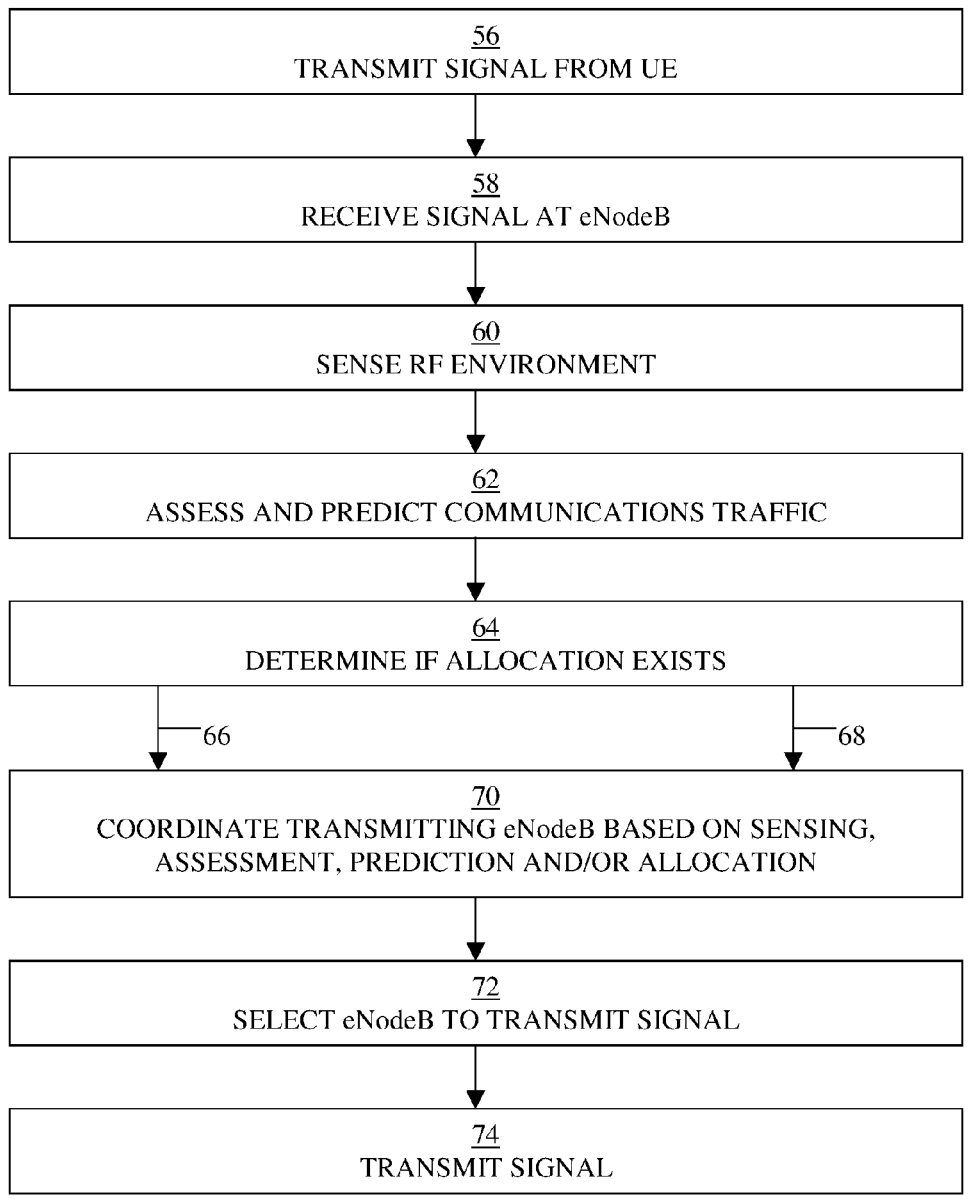
FIG. 10 is a sequence diagram showing interaction between the central node of FIG. 2 and a User Equipment (UE).

FIG. 10 is a sequence diagram showing interactions between an instance of an end node comprising a UE and a central node comprising eNodeB 18, according to an embodiment of the present disclosure.

Flow begins at block 56 in which a radio communications signal is transmitted from a UE, e.g., UE 12. At block 58, a first signal, such as signal 16 in FIG. 1, is received at eNodeB 18. The RF environment is then sensed at block 60 by sensing engine 40 to determine availability of RF bands. Assessment is then carried out as to the volume of communications traffic, and prediction is made as to forthcoming traffic by analytics engine at block 62. At block 64, coordination engine 42 determines whether an allocation of an available RF band is made to an operator. If yes, the sensing, assessment, prediction and allocation are fed to coordination engine 42 at decision 66; if no, the sensing, assessment and prediction are then fed to coordination engine 42 at decision 68. Coordination engine 42, at block 70, then coordinates which eNodeB 30 of eNodeB 18 is to transmit a second, modulated signal, such as signal 20 in FIG. 1 and based on the first signal, based on the sensing, assessment, prediction and/or whether an allocation of an available RF band to a particular operator exists. At block 72, coordination engine 42 selects the transmitting eNodeB 30. At block 74, the second signal is transmitted from the selected eNodeB 30.

It is to be understood that selection and activation of one or more eNodeBs 30 respectively corresponding to one or more RF bands may occur simultaneously.

Accordingly, the above described exemplary embodiments provide a RAN capable of being deployed on demand in situations where it is necessary and/or desirable to initially provide and/or supplement radio communications ability. Moreover, such embodiments provide that ability with comparatively lower power consumption afforded by the discussed SoC implementation and its virtualization of conventionally, separately provided core components.

The present embodiments are not limited to the particular embodiments illustrated in the drawings and described above in detail. Those skilled in the art will recognize that other arrangements could be devised. The present embodiments encompass every possible combination of the various features of each embodiment disclosed. One or more of the elements described herein with respect to various embodiments can be implemented in a more separated or integrated manner than explicitly described, or even removed or rendered as inoperable in certain cases, as is useful in accordance with a particular application While the present embodiments have been described with reference to specific illustrative embodiments, modifications and variations of the present embodiments may be constructed without departing from the spirit and scope of the present embodiments as set forth in the following claims.

While the present embodiments have been described in the context of the embodiments explicitly discussed herein, those skilled in the art will appreciate that the present embodiments are capable of being implemented and distributed in the form of a computer-usable medium (in a variety of forms) containing computer-executable instructions, and that the present embodiments apply equally regardless of the particular type of computer-usable medium which is used to carry out the distribution. An exemplary computer-usable medium is coupled to a computer such the computer can read information including the computer-executable instructions therefrom, and (optionally) write information thereto. Alternatively, the computer-usable medium may be integral to the computer. When the computer-executable instructions are loaded into and executed by the computer, the computer becomes an apparatus for practicing the embodiments. For example, when the computer-executable instructions are loaded into and executed by a general-purpose computer, the general-purpose computer becomes configured thereby into a special-purpose computer. Examples of suitable computer-usable media include: volatile memory such as random access memory (RAM); nonvolatile, hard-coded or programmable-type media such as read only memories (ROMs) or erasable, electrically programmable read only memories (EEPROMs); recordable-type and/or re-recordable media such as floppy disks, hard disk drives, compact discs (CDs), digital versatile discs (DVDs), etc.; and transmission-type media, e.g., digital and/or analog communications links such as those based on electrical-current conductors, light conductors and/or electromagnetic radiation.

Although the present embodiments have been described in detail, those skilled in the art will understand that various changes, substitutions, variations, enhancements, nuances, gradations, lesser forms, alterations, revisions, improvements and knock-offs of the embodiments disclosed herein may be made without departing from the spirit and scope of the embodiments in their broadest form.

What is claimed is:
1. A communications apparatus, comprising:
  a Long Term Evolution (LTE) central node comprising
    at least a pair of radio base stations;
    a plurality of processors; and
    at least a pair of virtualized cores respectively and operatively connected with the pair of radio base stations, each radio base station and each core being configured together on a common platform of a system on a chip (SoC) and forming a base station and core set configured to accommodate a predetermined radio frequency (RF) band;
    one or more sensors configured to sense RF band availability;
    a coordinator configured to receive the sensed RF band availability;

analytics configured to gather real-time communications traffic data and prediction data based thereon, and to provide each of the data to the coordinator, and in response to the sensed RF band availability, the real-time communications traffic data, the prediction data based thereon and an allocation of an available RF band comprising a correspondence between the available RF band and an operator network identification (ID), a specific one of each radio base station and core set is selected by the coordinator to carry out radio communication via the allocated RF band, each base station and core set being configured to selectively coordinate communications traffic.

2. The communications apparatus of claim 1, wherein:
each of the pair of cores comprises an Evolved Packet Core (EPC).

3. The communications apparatus of claim 2, wherein:
the EPC comprises one or more programming instructions.

4. The communications apparatus of claim 1, wherein:
the specific radio base station and core set corresponding to the allocated RF band is configured to be operable, in accordance with the allocation, in response to switching within the specific core.

5. The communications apparatus of claim 4, wherein:
the switching enables routing of communications traffic to a Mobile Network Operator (MNO).

6. The communications apparatus of claim 1, wherein:
each radio base station and core set is configured to offload data.

7. The communications apparatus of claim 6, wherein:
the specifically selected radio base station and core set is configured to offload data through a backhaul connection.

8. The communications apparatus of claim 1, wherein:
at least one of the pair of cores is split between the central node and a hub.

9. In a radio access network (RAN), a communications method comprising:

receiving a first signal at a central node comprising at least a pair of radio base station and virtualized core sets, in which each set is disposed on a common platform of a system on a chip (SoC);

sensing availability of one or more radio frequency (RF) bands;

coordinating the availability of the one or more RF bands;

assessing communications traffic, and predicting forthcoming communications traffic based on the assessing;

in response to the sensing, the assessing, the predicting and an allocation of an available RF band comprising a correspondence between the available RF band and an operator network identification (ID), selecting a specific one of the radio base station and virtualized core sets for carrying out radio communication via the allocated RF band, and transmitting, via the allocated RF band, a second signal, based on the first signal, each base station and core set being configured to selectively coordinate communications traffic.

10. The method of claim 9, wherein:
the specific radio base station and core set corresponding to the allocated RF band is configured to be operable, in accordance with the allocation, in response to switching within the specific core.

11. The method of claim 10, wherein:
the switching enables routing of communications traffic to a Mobile Network Operator (MNO).

12. The method of claim 9, further comprising:
offloading data in response to the assessing.

13. The communications apparatus of claim 1, wherein:
the coordinator is a coordination engine interconnected with an eNodeB.

14. The method of claim 9, wherein:
the coordinating is performed by a coordination engine interconnected with an eNodeB.

* * * * *